Jan. 7, 1958 R. E. HARTLINE ET AL 2,818,728
PRODUCTION TESTING OF WELLS WHILE VARYING PRODUCING CONDITIONS
Filed Aug. 14, 1953 3 Sheets-Sheet 1
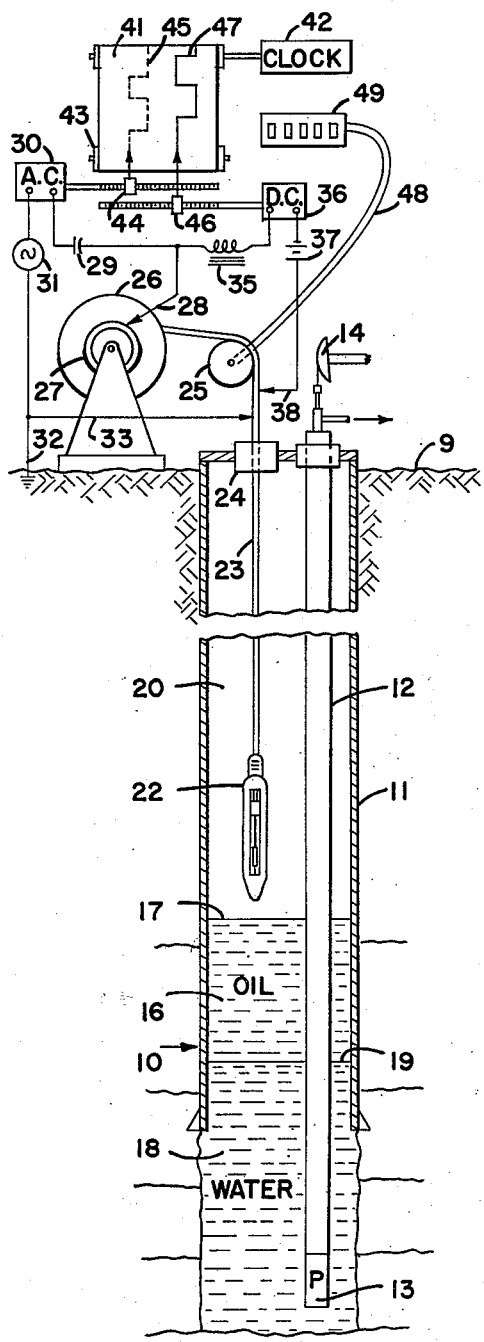
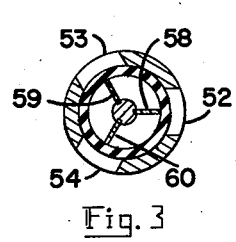
Fig. 3
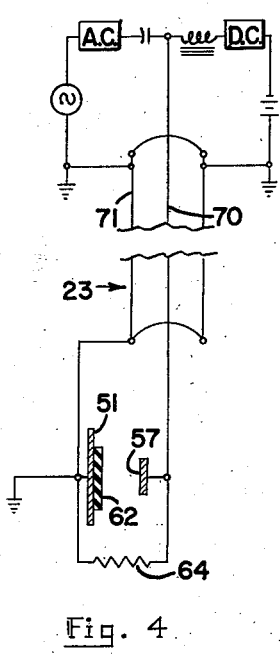
Fig. 4
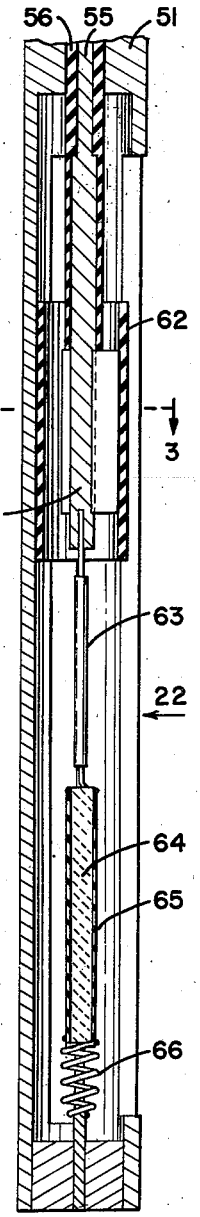
Fig. 2
*INVENTORS:*
RALPH E. HARTLINE
DANIEL SILVERMAN
BY Newell Pottorf INVENTORS:
RALPH E. HARTLINE
DANIEL SILVERMAN
BY Newell Potter
ATTORNEY

United States Patent Office 2,818,728
Patented Jan. 7, 1958

2,818,728

PRODUCTION TESTING OF WELLS WHILE VARYING PRODUCING CONDITIONS

Ralph E. Hartline and Daniel Silverman, Tulsa, Okla., assignors to Pan American Petroleum Corporation, a corporation of Delaware Application August 14, 1953, Serial No. 374,178

9 Claims. (Cl. 73—155)

This invention relates to the transient testing of wells producing more than one fluid, such as wells producing both oil and water, and is directed particularly to procedures for making tests designed to show separately the producing characteristics of a well for each of these fluids, as well as to provide information about other reservoir characteristics. The term "transient" is used herein to designate tests performed on a well while the well-production rate and the bottom-hole pressure therein are varying, as distinguished from well-production tests carried out under steady-state conditions of constant production and bottom-hole pressure.

Steady-state well production tests of the "well potential" type frequently performed heretofore generally have required long periods of time during which the well is produced at one fixed rate until equilibrium producing conditions are established, the corresponding equilibrium fluid level or bottom-hole pressure within the well bore is ascertained, production is changed to another fixed rate, and after another time interval a new value of fluid level or bottom-hole pressure is observed. These steps may be repeated several times in obtaining a complete curve of well production as a function of bottom-hole pressure.

This method of testing yields useful information but frequently requires such very long times to perform as to be impractical, particularly in wells which are slow to reach a new producing equilibrium after each change in producing rate. Also, the results may be difficult to interpret in that the production of oil and of water may not be separately measurable with the desired accuracy.

A primary object of our invention accordingly is to provide a new and improved well-testing procedure by which data of the general type mentioned are obtained in much shorter lengths of time than formerly. A further object of the invention is to provide an improved well-testing method in which substantially all of the required data are obtained while the well conditions are progressing toward a condition of equilibrium, but without waiting for them to reach equilibrium. A still further object is to provide an improved well-testing procedure in which accurate measurements are made of the production of oil and water separately, as well as of the total fluid production of the well formations. Still another and further object is to provide an improved well-testing procedure in which substantially all of the well and reservoir evaluation data are obtained with a limited amount of manipulation of the well conditions. Another and still further object is to provide a well-testing method which yields information about the well and reservoir producing characteristics that is not available from steady-state tests. Other and further objects, uses, and advantages of the invention will become apparent as the description proceeds.

Briefly stated, the foregoing and other objects are accomplished by starting a testing procedure with a well preferably at or close to one of two conditions. It may be at or close to a condition of static equilibrium, such as occurs after stopping production and letting the well fluids rise in the well annulus until their hydrostatic pressure at the level of the producing formation substantially balances the pressure within the formation. Since oil is immiscible with and lighter than water in wells which produce both of these fluids, the annulus column then normally comprises a column of oil superimposed on a column of water.

The other condition for starting a test may be that which exists after a well has been produced for a substantial period of time at a given rate. In this condition the interface between the annulus oil and water columns is usually located at the inlet to the well-production tubing, and the top of the annulus liquid column is close to its equilibrium level at the given producing rate.

Assuming that a well to be tested is in the first condition mentioned—that is, near static equilibrium—the test is started by placing the well on production at a given rate. This draws the annulus liquid column downwardly, and in accordance with our invention, the downward movements of both the oil-water interface and the top of the oil column are followed substantially continuously, as by observing them alternately at fairly closely spaced intervals of time. Knowing the specific gravities of the oil and the water, the resulting data permit calculation of the exact bottom-hole pressure at any instant, neglecting the effect of one of the immiscible fluids passing through the other, such as the produced oil rising through the column of water. Since the amount of produced oil rising through the water column is generally small compared to the total amounts of water and oil present, neglecting the effect of this oil produces only a small error in the calculated bottom-hole pressure.

The produced oil is not neglected, however, insofar as it affects the positions of the measured fluid interfaces, since the lengthening of the oil column, for example, is taken as the quantitative measurement of the oil produced, while the change in length of the water column, taking into account the effect of fluid withdrawal through the tubing, reflects the water production. If greater accuracy is desirable, the effect of one of the immiscible fluids moving through the other can be closely estimated and subtracted to achieve substantially correct results.

Since the rate of fluid withdrawal by the pump is known and represents the sum of the fluids coming from the well annulus and the fluids coming from the formations, it will be understood that the latter are quantitatively determined simply by subtraction of the annulus fluid rate, as measured, from the total fluid-withdrawal rate.

In some wells, the desired data are provided by measurements made during a single draw-down as described. In most wells, however, additional information is provided by a second phase of testing which is started with the annulus liquids in a drawn-down condition. A build-up of the annulus liquid column is carried out by discontinuing the production of the well through the well tubing and letting the fluids produced from the well formations flow into and rise in the well annulus, while observations are made, as before, of the positions of the oil-water interface and the top of the oil. The bottom-hole pressures and corresponding rates of oil and water production can be ascertained from this data in the same way as from the measurements made during draw-down.

As is believed apparent, either the draw-down or the build-up series of measurements may each be carried out independently of the other series of measurements, or they may be made in the reverse order by first making measurements during a build-up from a producing condition, followed by measurements during a draw-down from whatever level is reached during the build-up.

This will be better understood by reference to the accompanying drawings forming a part of this application, illustrating a preferred embodiment of the invention and the results obtained thereby. In these drawings, Figure 1 is a cross-section of a well bore and a diagrammatic illustration of surface equipment used for carrying out the invention;

Figure 2 is a cross-section of a preferred form of interface detecting device;

Figure 3 is a cross-section of Figure 2 on the line 3—3;

Figure 4 is a wiring diagram of the detecting equipment;

Figure 5:
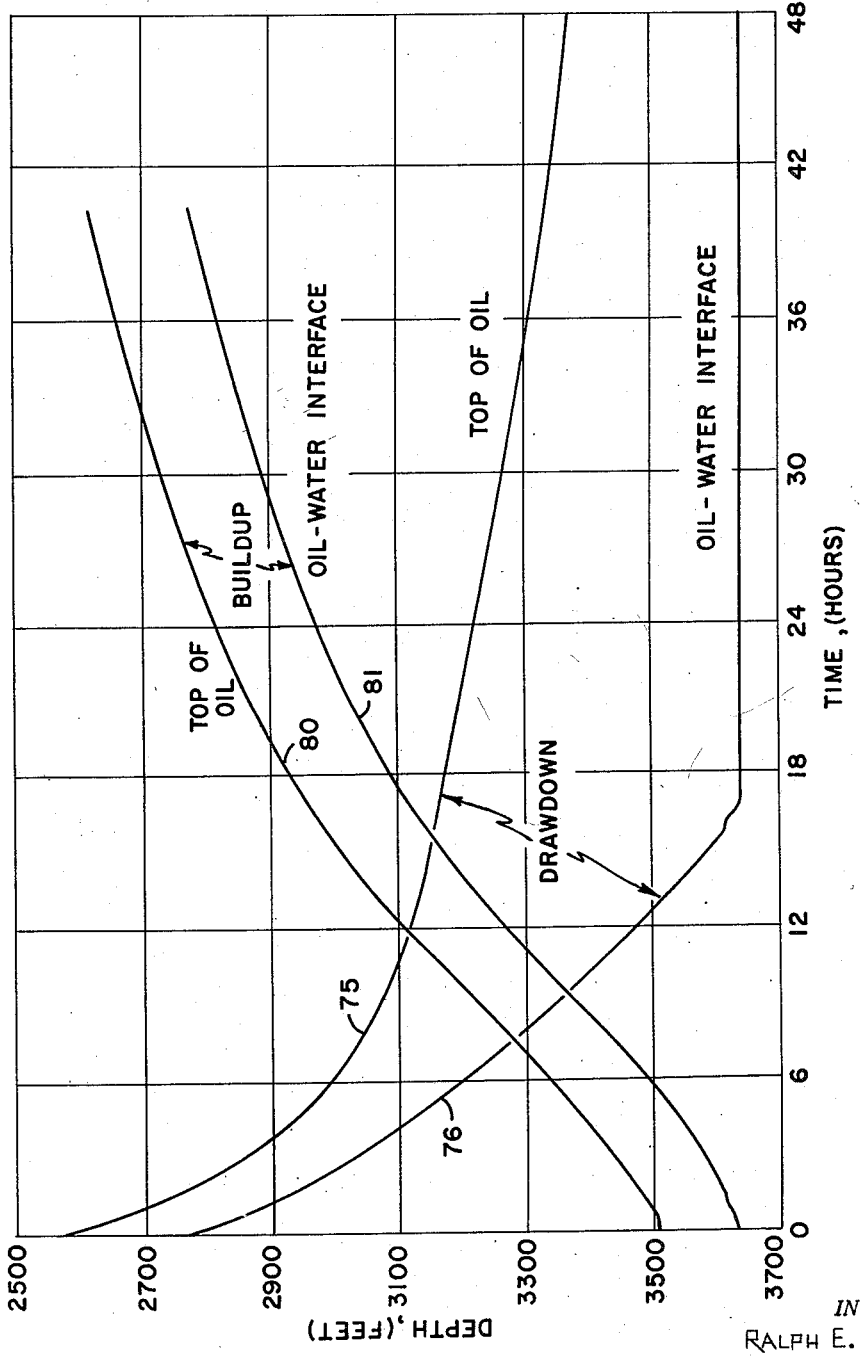
Figure 5 represents graphically the data obtained in practicing the invention.

Referring now to Figure 1 in detail, an oil- and water-producing well 10 shown in cross-section extends from the ground surface 9 to the producing formations. Well 10 is equipped with a casing 11 and a tubing 12 and is produced by means of a pump 13 operated by conventional equipment 14 at surface 9 to lift fluids from the well through the tubing 12. Normally present in the annulus 20 of well 10 outside of tubing 12 is a liquid column consisting of an upper body of oil 16 having a top surface 17 and a lower body of water 18 forming an interface with oil 16 at the level 19. As the top surface 17 of the oil 16 is normally the interface between the liquids and the gas in the annular space 20, it will generally be referred to hereinafter as the liquid level 17, and the level 19 will ordinarily hereinafter be called the oil-water interface 19.

When the producing of well 10 through tubing 12 has been discontinued for a substantial period of time, liquid level 17 and oil-water interface 19 both normally rise within annular space 20 to levels considerably above the producing formations. Conversely, after producing well 10 for a period of time through tubing 12 by pump 13, the annulus liquids are drawn downwardly in annulus 20, the oil-water interface 19 finally reaching a stabilized position at the inlet to pump 13 near the bottom of the well, and liquid level 17 dropping toward a position of producing equilibrium at some point thereabove.

For observing liquid level 17 and oil-water interface 19 during the testing of a well in accordance with our invention, a detecting device 22 is provided, which is adapted to be lowered through the annulus 20 from ground surface 9 on an armored, insulated-conductor cable 23 which, at the top of casing 11, passes through a packing gland 24 and over a depth-measuring wheel 25 to a cable reel 26. The insulated conductor 70 of cable 23 is connected to a slip ring 27 on reel 26, which ring is contacted by a stationary brush 28 connected by appropriate leads through a condenser 29 and an alternating-current responsive device 30 to an alternating-current generator 31. The alternating-current circuit is completed from generator 31 by a lead 32 which extends to ground and/or by a lead 33 which is in contact with the external armor 71 of the cable 23.

A direct-current circuit also is provided by connecting the brush 28 through an inductance coil 35 and a direct-current responsive device 36 to a battery 37, the other terminal of the battery being connected in the same way as the alternator 30 to ground or by a lead 38 to the armor of cable 23. The devices 30 and 36 respectively produce indications on a chart 41 drawn by a clock mechanism 42 in accordance with time from a supply roller 43, the alternating-current responsive device 30 actuating a recording pen 44 to produce the trace 45, while direct-current responsive device 36 similarly actuates a pen 46 to produce the trace 47. The depth of detector 22 in annulus 20 of well 10 is indicated on a counter 49 by a flexible connection 48 extending from depth-measuring wheel 25.

The functioning of detector 22 can be more easily understood by reference to Figures 2 and 3 which show it in more detail. Detector 22 has an outer cylindrical metal body 51 provided with longitudinal slots 52, 53, and 54 which freely admit well fluids into the interior of the detector. The insulated conductor 70 of cable 23 is connected to a central rod 55 separated by insulating sleeve 56 from the body 51 of detector 22. The lower end of rod 55 is exposed to the well fluids and forms an electrode 57 provided with radial vanes 58, 59, and 60 extending generally longitudinally and preferably spaced 120° apart around the electrode 57. These vanes are surrounded by a thin tubular insulating jacket 62 which effectively prevents electrical shorting of the electrode structure 57 to housing 51 and also elongates the electrical conducting path through the liquids in which the detector 22 is submerged.

From electrode 57 an insulated conductor 63 extends to the upper end of a carborundum resistor 64 located in the bottom portion of the detector 22. The middle portion of resistor 64 is covered by an insulating film 65, and the lower end of the resistor is connected through a spring 66 to the bottom portion of the detector 22.

The electrical circuits involved here are shown in Figure 4. The cable 23 is composed of the central insulated conductor 70 and the outer sheath 71, conductor 70 being connected to electrode 57 and to resistor 64 in parallel. The liquids in which detector 22 is submerged form the conducting path between electrode 57 and the body 51 of detector 22, the function of insulating sleeve 62 being to elongate the conduction path through this liquid. It has been observed that such an arrangement of electrodes is quite effective in reducing the interference effects due to oil partially covering the surface of electrode 57 and thereby interrupting the current flow. Even in the absence of a partially insulating oil film, the density of current flow from electrode 57 varies considerably from point to point of the electrode surface. The chief effect of an oil film partially covering the electrode therefore is to shift the current path to an uncovered portion of the electrode, and the apparent fluid resistivity being measured is not greatly affected until the electrode surface is almost completely oil-covered.

The generally longitudinal arrangement of the vanes 58, 59, and 60 provides for free circulation of liquids both through the slots 52, 53, and 54 and between the measuring electrodes. This circulation helps to keep globules of oil from collecting in these spaces and covering the electrode surfaces. Detector 22 is well adapted, not only for locating an interface such as the oil-water interface 19, but also for detecting variations in the resistivity of water column 18 due to varying salinity, even in the presence of globules of oil rising therethrough.

It is the function of carborundum resistor 64 to locate the liquid level 17 in annulus 20. This resistor 64 has a negative temperature coefficient of resistance which is not only large but, at an elevated critical temperature level, increases very rapidly. Application of progressively greater values of direct-current voltage thereafter causes higher temperatures and currents until the critical temperature range is reached, above which a small increase in voltage produces a quite large increase in current flow. The voltage at which this critical temperature range is reached depends upon the surrounding medium, a substantially larger voltage being required to produce the large "breakdown" current flow in the presence of cooling oil or water than in the presence of gas. Consequently, when a critical voltage is being applied just sufficient to produce a large current flow in the presence of gas, the sudden cooling upon entering a liquid causes a large resistance increase and a sharp drop in the current.

As the impedance of resistor 64 is always large compared to the effective resistance between electrodes 51 and 57, its shunting effect on the alternating-current flow between the electrodes 51 and 57 for detecting oil-water interface 19 is negligible, particularly when resistor 64 is surrounded by a cool liquid.

In operation, if it be assumed that a test is started with the well 10 near a static equilibrium condition, production of the well 10 at a given rate by the pump 13 is begun, and drawn-down of the liquids in annulus 20 and production of liquids from the well formation simultaneously occur. Liquid level 17 and oil-water interface 19 are closely followed by moving detector 22 alternately upwardly and downwardly past the two levels in the annulus 20, thereby producing the sudden changes appearing on the traces 45 and 47 of the chart 41 as each of the respective interfaces 17 and 19 is passed. Preferably the depth indication of counter 49 is noted or stamped on chart 41 at each instant when trace 45 or 47 shows the crossing of an interface.

In any event, data are recorded that can be used to produce accurate graphs of the two interface positions as functions of time, such as the graphs 75 and 76 shown in Figure 5. When water is produced from the formations into the well bore, it either enters water column 18 and descends to the inlet of pump 13, or if oil is present at the level where the water is produced, it descends in globules through the oil to the pump inlet. On the other hand, oil that is produced from the well formations rises through the water column 18 past oil-water interface 19 and thereby lengthens oil column 16, as long as the oil production takes place below interface 19. Oil produced from formations above interface 19 passes directly into and lengthens the oil body 16.

If the production of well 10 is continued for a sufficient length of time, the oil-water interface 19 moves downwardly to the inlet of pump 13 as shown by curve 76. It thereafter remains at that level, and pump 13 simultaneously produces both oil and water through tubing 12, while the top 17 of the oil may continue to descend as long as it has not reached its equilibrium level at the given producing rate.

Figure 6:
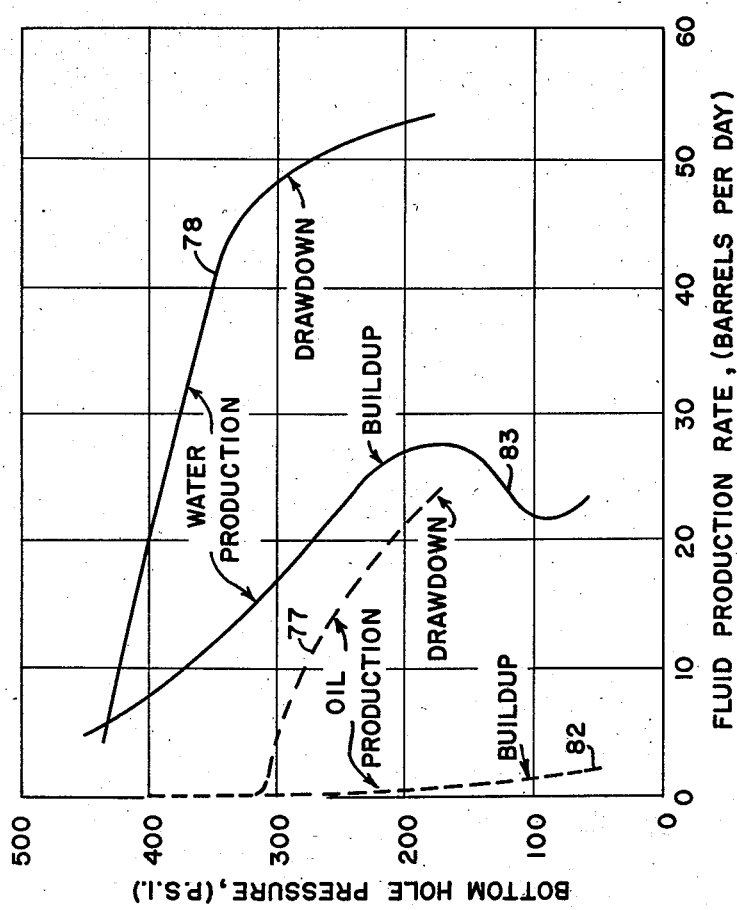
Figure 6 shows the resulting computed curves of oil and water production as a function of bottom-hole pressure obtained from interpretation of the data shown in Figure 5.

From curves such as the graphs 75 and 76, the lengths of both the oil and the water columns can be ascertained at any given instant of time, and therefore by taking into account the different specific gravities of the two liquids, the actual bottom-hole pressure at the pump inlet can be computed. Consequently, curves such as graphs 77 and 78 of Figure 6 can be plotted to show, respectively, the production of oil and of water for any given value of bottom-hole pressure during the draw-down tests. As a specific example of this computation, assume the oil 16 and the salt water 18 to have specific gravities of .812 and 1.016 grams per milliliter, respectively. This means that each foot of length of the oil column creates about .352 pound, and each foot of salt water contributes about .440 pound per square inch to the bottom-hole pressure.

Thus, from graphs 75 and 76 at a time of 6 hours, for example, the liquid column above the pump inlet was about 645 feet in length. It consisted of about 210 feet of oil creating about 74 pounds per square inch of bottom-hole pressure, and about 435 feet of salt water creating about 191.5 p. s. i. at the pump inlet. The total bottom-hole pressure at this time was therefore the sum of these pressures, or about 265.5 p. s. i.

Corresponding values of bottom-hole pressure are computed in the same way from graphs 75 and 76 for other values of time. For example, at a time of 12 hours the total bottom-hole pressure is about 197.4 p. s. i. due to about 360 feet of oil column and about 160 feet of water column.

Before the oil-water interface 19 is drawn down to the pump inlet, only salt water is lifted through tubing 12 by operating pump 13 at a known, steady rate. During this time, the rate of oil production is determined by observing the rate of lengthening of the oil column in annulus 20 of known cross-sectional area. Similarly, the rate of salt-water production by the formations is determined from the known pumping rate minus the rate of withdrawal from annulus water column 18, the latter being determined from graph 76 by observing its slope.

After interface 19 reaches the inlet to pump 13, both oil and water are lifted by the pump through tubing 12. The oil and water reaching the ground surface 9 are separated and gauged by conventional means (not shown), the water rate so determined now being the formation water rate, since the water is removed by pump 13 as fast as it is produced. The formation oil rate is ascertained as the pumped oil rate minus the rate of withdrawal from the annulus oil column, as determined from the slope of curve 75.

In this way for each computed value of bottom-hole pressure, a corresponding formation oil-producing rate and the related but independent water-producing rate are determined for plotting graphs 77 and 78.

After the annulus liquids have thus been drawn down, and preferably after the oil-water interface 19 has reached the inlet of pump 13, the second or build-up portion of the test can be begun. This is done by stopping the pump 13 and allowing the fluids produced from the well formations to raise the fluid levels in the annulus 20. While this is occurring, the detector 22 is raised and lowered through the annulus past the fluid level 17 and the interface 19 to follow them closely in exactly the same manner as during the draw-down test. Data are obtained in this manner to plot build-up curves 80 and 81 of Figure 5.

The data represented by these curves are utilized in the same manner as the draw-down data to compute bottom-hole pressures and corresponding rates of production of oil and of water. Accordingly, the curves 82 and 83 can be plotted, respectively showing oil and water production as functions of the bottom-hole pressure during build-up. All of the curves shown here are based on data obtained in a producing well in the Richardson Field of Stafford County, Kansas.

The significance of transient well tests carried out in the manner described will be appreciated when the great difference between the respective oil-production curves on build-up and on draw-down is noted. Likewise of significance are the differences between the water-production curves for the two conditions and the ratio of the oil to the water production. From such test results as these, valuable deductions and calculations can be made as to the nature of the producing reservoir, leading to more efficient methods of production and greater ultimate recovery.

In some wells or for some purposes, a single set of draw-down or build-up curves might be sufficient. In what we believe is the best mode of practicing our invention, however, both draw-down and build-up curves are obtained and are desirable.

Where the data for build-up and draw-down are so markedly different as here, still further information may be provided by initiating additional draw-downs or build-ups at different bottom-hole pressures. In other words, build-up and draw-down curves are obtained not only over major ranges of variation of bottom-hole pressure but may also include reversals of the direction of movement of the annulus liquid periodically during any one major testing period. That is, during the build-up test a limited draw-down may be performed, and likewise during a major draw-down, the production may be interrupted for a short period of time to permit a minor build-up of the fluid levels in the annulus.

Ordinarily, the changes in well-producing conditions desired for practicing the invention are brought about by changing the rate of operation of pump 13 from one fixed value to another, one of which values may be zero, or shut-down. This is not the only way of accomplishing this, however, as the pump rate can also be varied in a continuous or discontinuous known manner over a period of time, in either direction—that is, to increase or to decrease the withdrawal rate.

In any event, the data which are accumulated in a much shorter length of time than is required for obtaining the data where producing conditions must always be at equilibrium before a measurement is made. Since, in view of the foregoing disclosure, still further modifications and changes in the procedure of carrying out the invention will be apparent to those skilled in the well testing art, the invention should not be considered as limited to the details described, but its scope is properly to be ascertained by reference to the appended claims.

We claim:

1. The method of testing wells which produce both oil and water which comprises the steps of changing the rate of withdrawal of liquids from near the well bottom to change the producing conditions of a well and initiate continuing changes in its bottom-hole pressure which during a period of time continuously vary the production of liquids from the formations into the well bore, and substantially simultaneously locating and recording with respect to time successive positions of both the liquid level and the oil-water interface therein during said period of time, while said level and said interface are each moving between two equilibrium positions, one of said equilibrium positions being a position of static equilibrium and the other being a position of producing equilibrium, whereby values of bottom-hole pressure and corresponding production rates of oil and water respectively can be computed.

2. The method of claim 1 in which said locating step comprises repeatedly moving a detecting device alternately up and down through the liquids in the well annulus.

3. The method of claim 1 in which said withdrawal-rate changing step comprises decreasing the rate of withdrawal of liquids through a well tubing extending to near the well bottom, whereby the liquids in the annulus and the liquid level and oil-water interface therein all move upwardly toward positions of static equilibrium.

4. The method of claim 3 in which said withdrawal-rate decreasing step comprises decreasing said rate to zero.

5. The method of claim 1 in which said withdrawal-rate changing step comprises increasing by a known amount the rate of withdrawal of liquids through a well tubing extending to near the well bottom, whereby the liquids in the annulus and the liquid level and oil-water interface therein all move downwardly towards positions of producing equilibrium.

6. The method of claim 5 wherein said withdrawal-rate is increased from an initial value of zero.

7. The method of testing wells which produce both oil and water which comprises, with the fluid-level conditions in the well annulus close to static equilibrium conditions, initiating a withdrawal of liquids from the well bore at a known rate through a tubing extending to a point near the well bottom to draw down during a first period of time the liquids in said annulus and to cause liquids to enter the well bore from the well formations, repeatedly moving a detecting device alternately up and down through the liquids in the well annulus to locate and record with respect to time during said first period of time successive positions of both the liquid level and the oil-water interface therein, discontinuing said withdrawal when said liquid level and said interface have progressed a substantial portion of the way to their producing equilibrium positions, whereby the liquids entering said well bore from the formations during a second period of time raise the annulus liquid level and the oil-water interface in said annulus, and continuing to move said detecting device alternately up and down to locate and record with respect to time during said second period of time successive positions of said liquid level and said interface while they are moving upwardly toward their positions of static equilibruim, whereby values of bottom-hole pressure and corresponding production rates of oil and water respectively can be computed.

8. The method of claim 7 in which said withdrawal step is continued at least until said oil-water interface is drawn down to the inlet of said tubing.

9. The method of testing wells which produce both oil and water which comprises producing a well at a given rate for a substantial period of time through a tubing extending to a point near the well bottom to cause the annulus liquid-level conditions to approach producing equilibrium values for said given rate, discontinuing said well-producing step, whereby fluids entering the well bore from the formations during a first period of time raise the fluid level in the annulus, repeatedly moving a detecting device alternately up and down through the annulus liquids to locate and record with respect to time during said first period of time successive positions of both the liquid level and oil-water interface, until said liquid level and said interface have progressed a substantial portion of the distance to their static equilibrium positions, resuming withdrawal of liquids from said well bore through sad tubing at known rate to draw down the annulus liquids and increase fluid production from the formations into the well bore during a second period of time, and continuing said detector moving step during said second period of time while the liquid level and the oil-water interface move downwardly a substantial distance toward their producing equilibrium positions, whereby values of bottom-hole pressure and corresponding production rates of oil and water respectively can be computed.

References Cited in the file of this patent
UNITED STATES PATENTS

| | | |
|---|---|---|
| 2,161,733 | Walker | June 6, 1939 |
| 2,360,742 | Toth et al. | Oct. 17, 1944 |
| 2,413,435 | Courter | Dec. 31, 1946 |
| 2,585,412 | Silverman | Feb. 12, 1952 |